United States Patent [19]

Smith

[11] Patent Number: 4,954,689

[45] Date of Patent: Sep. 4, 1990

[54] WELDING UNIT

[76] Inventor: Chalmers O. Smith, 825 Woodridge, Rochester, Mich. 48063

[21] Appl. No.: 379,351

[22] Filed: Jul. 12, 1989

[51] Int. Cl.$^5$ ............................................. B23K 9/12
[52] U.S. Cl. ................................... 219/125.1; 219/127
[58] Field of Search .................. 219/125.1, 127, 124.1, 219/136; 228/45

[56] References Cited

U.S. PATENT DOCUMENTS

| | | | |
|---|---|---|---|
| 2,818,494 | 12/1957 | Bernard et al. | 219/125.1 |
| 3,062,950 | 11/1962 | Chyle | 219/127 |
| 4,709,133 | 11/1987 | Mainville | 219/125.1 |

Primary Examiner—Clifford C. Shaw
Attorney, Agent, or Firm—Basile and Hanlon

[57] ABSTRACT

A welding unit of semi-automatic design for use in spot welding applications in which limited production volumes, low labor rates, and other cost-related factors negate the use of high production, fully automated units. The welding unit comprises two automatic feed GMA spot welding units disposed within a housing and parallel adjacent mountings which allow for fore-aft sliding movement relative to one another and having the weld heads projecting outwardly through the front face of the housing for contact with the work surface. Gear racks mounted in parallel face-to-face configuration on each weld head mounting, and pinion gear disposed between and in contact with the gear racks of each weld head, cooperate to translate fore or aft motion of one weld mount into opposite movement for the other. The assembly allows formation of an axially placed series of adjacent spot welds to be placed on a workpiece utilizing one unit.

12 Claims, 4 Drawing Sheets

WELDING UNIT

BACKGROUND OF THE INVENTION

1. Field of the Invention

The present invention relates to a semi-automatic welding unit capable of simultaneously completing multiple welds, for use in low to medium volume spot welding applications.

2. Description of the Prior Art

Automotive assembly processes have generally focused on large volume mass production techniques. Such production volumes, which may exceed 60 units per hour, require fully-automated, high-speed assembly equipment which is capital intensive and, due to time constraints inherent in such production, must be duplicated for each operation, since movement of these units is impractical during assembly and production. Such high capital expenditures are, however, justifiable in view of the correspondingly high production volumes and also in view of the displacement of manual labor operations which, in many industrialized markets, are costly relative to markets with low labor costs.

Welding is a process which typically falls into the above category. As an automobile body progresses along a high-volume assembly line, various welding operations are generally performed by individual welding units which are each responsible for a single, or relatively low number of operations at a localized position on the vehicle. For example, on a typical four-door sedan having two hinges per door, up to eight welding units must be employed to join the hinges to the door pillars.

Renewed interest in low volume models of a specialty type has seen production rates for some models dipping as low as 12 to 15 units per hour. This decrease in production, combined with a proliferation of models from various markets, has inevitably required new assembly processes. Additionally, the removal of significant production to developing nations with relatively low labor costs, requires development of production processes which utilize this inexpensive labor efficiently. The present invention addresses the above problems in its application to welding units.

SUMMARY OF THE INVENTION

In accordance with the present invention, a welding unit of semi-automatic design, for use in GMA spot welding applications in which limited production volumes and low labor rates negate the use of high production, fully-automated units is provided. The welding unit can be divided into two subassemblies; namely, the weld unit and corresponding housing, and the work station framework and associated equipment. The weld unit includes a flat plate-like base member to which two parallel slider assemblies are attached. The slider assemblies comprise parallel rods which are affixed at their axially opposed ends. Brackets are mounted for linear movement along the rods and function to support mounting plates which extend outwardly therefrom. Movement of the mounting brackets axially along the slider assembly will correspondingly move the mounting plates. Rack and pinion means comprising first and second gear racks attached to each slider assembly in parallel face-to-face orientation, and a pinion gear fixedly attached to the base member, between and in contact with each of the first and second gear racks, provides for movement of one mounting bracket along its corresponding slider assembly to move through the rack and pinion assembly to the other mounting bracket in an opposite direction along its corresponding slider assembly.

In order to move the mounting brackets along their corresponding slider assemblies, motor means such as a piston and cylinder arrangement, which is fixed relative to the base member, and having a piston rod attached to one of the mounting brackets, drives the bracket axially and reciprocally along its slider assembly resulting in corresponding movement, in the opposite direction, of the non-driven mounting bracket through the action of the rack and pinion means.

First and second automatic feed GMA spot welding units are attached to each of the first and second mounting brackets, respectively. The welding units have welding heads which extend outwardly, along axes parallel to the slider rods, to terminate at locations which are predetermined by the welding operation to be carried out. The first and second mounting brackets are positioned on their respective slider assemblies so that when the first slider is positioned in its axially forward position on its respective rod, the second slider is in an equal but opposite rearwardly disposed position on its respective rod, thereby positioning the welding heads at axially offset positions relative to one another during welding operations. Such an orientation allows welds to be placed in positions which are directly adjacent to one another, but in an axially offset orientation. Following placement of a first pair of adjacent, but axially offset welds, the motor means attached to the first of the mounting brackets is activated to drive the bracket along its slider assembly, resulting in similar but opposite movement of the second mounting bracket and weld unit. As a result, the weld heads move axially with respect to one another to a second weld position, which is directly adjacent to the first set of welds placed in the first welding operation. The result is a series of directly adjacent welds, placed in subsequent welding operations by indexing the weld heads thereby eliminating problems inherent in attempting to place adjacent welds at the same time.

To protect the weld units and slider assemblies from harsh factory environments, a housing having a top, sides, front, rear and bottom portions enclose the weld head assembly. The base member, upon which the slider assemblies are mounted, may be utilized as the bottom of the housing. The front of the housing has openings through which the weld heads pass and, additionally, openings are positioned in the rear or top of the housing through which electrical wiring, inert gas hose, weld rod, and power sources for the weld units and motor means may pass.

The housing may be of a two-part, mirror image configuration in which one welding unit and its corresponding slider assembly is retained on one side and a second welding unit and its corresponding slider assembly is mounted on the other side of the housing. The pinion gear is mounted in the base portion of one housing side. The two housing portions are held together in alignment through the use of alignment pegs positioned in one side portion which enter peg alignment bores positioned in the second housing portion. The two housing portions are then clamped together using suitable clamping means, such as locking latches, or the like. To service a welding unit, the housing portions are simply separated by unlatching the clamping assemblies and pulling the units apart allowing complete access to either of the welding units.

The welding unit may be utilized in many applications. A typical application is suspension of the housing and corresponding welding units, from a work station framework having means for positioning the weld unit relative to the workpiece. The framework has a base with upwardly extending support members and an upper mounting member, supported by the vertical members from which a pivotally mounted supporting arm extends outwardly over the work area. The work station may be used to support the electrical supply, the inert gas supply and the continuous welding rod supply for the two spot welding units. A manually operable winch, or other control device, supports the weld unit at the end of the supporting arm, allowing the entire unit to be swung in a horizontal position above the work station and subsequently raised or lowered to a desired work position. Once the welding unit is in position above the workpiece, the winch is operated to lower the housing onto the workpiece. The housing has locating pegs extending outwardly from the bottom portion to positively locate the welding unit relative to the workpiece.

In operation, the welding unit is first positioned above the workpiece using the pivotal swing arm of the work station framework. Following positioning, the winch is activated to lower the weld unit onto the workpiece and to positively locate the unit using the locating pegs, extending from the housing, to engage corresponding apertures in the workpiece. Following location of the weld unit relative to the workpiece, and suitably grounding the workpiece as is well known in the art, the welding units are activated and two axially adjacent, linearly offset welds are formed on the workpiece. Subsequently, the motor means is activated to axially move the first mounting bracket and its corresponding weld unit relative to its first welding position. The second welding head simultaneously moves, through the rack and pinion assembly, in a similar but opposite axial direction. Following this indexing operation, the weld heads are in positions which are directly adjacent to the first set of welds. The welding units are reactivated and a second set of welds, directly adjacent to the first welds, are placed on the workpiece. Operation of the winch lifts the weld unit off of the workpiece and the workpiece is swung into position over the next welding position, or workpiece, as desired.

The present invention allows for an axially placed series of adjacent spot welds to be placed on a workpiece utilizing one welding unit. The welding operation has the high quality and precision of highly automated, high volume welding units while eliminating the multiunit redundancy of the high volume assembly line. Additionally, the unit is easily moved into different positions on the workpiece, thereby efficiently utilizing lower cost manual labor and allowing a single weld unit to replace several automated units by placing multiple welds at different positions on a relatively large workpiece. For example, as described above, on a typical four-door sedan, having two hinges per door, the eight welding units utilized in high volume automated production may be replaced by a single unit.

Other objects and features of the invention will become apparent by reference to the following specification and to the drawings.

DESCRIPTION OF THE PREFERRED EMBODIMENTS

Figure 1:
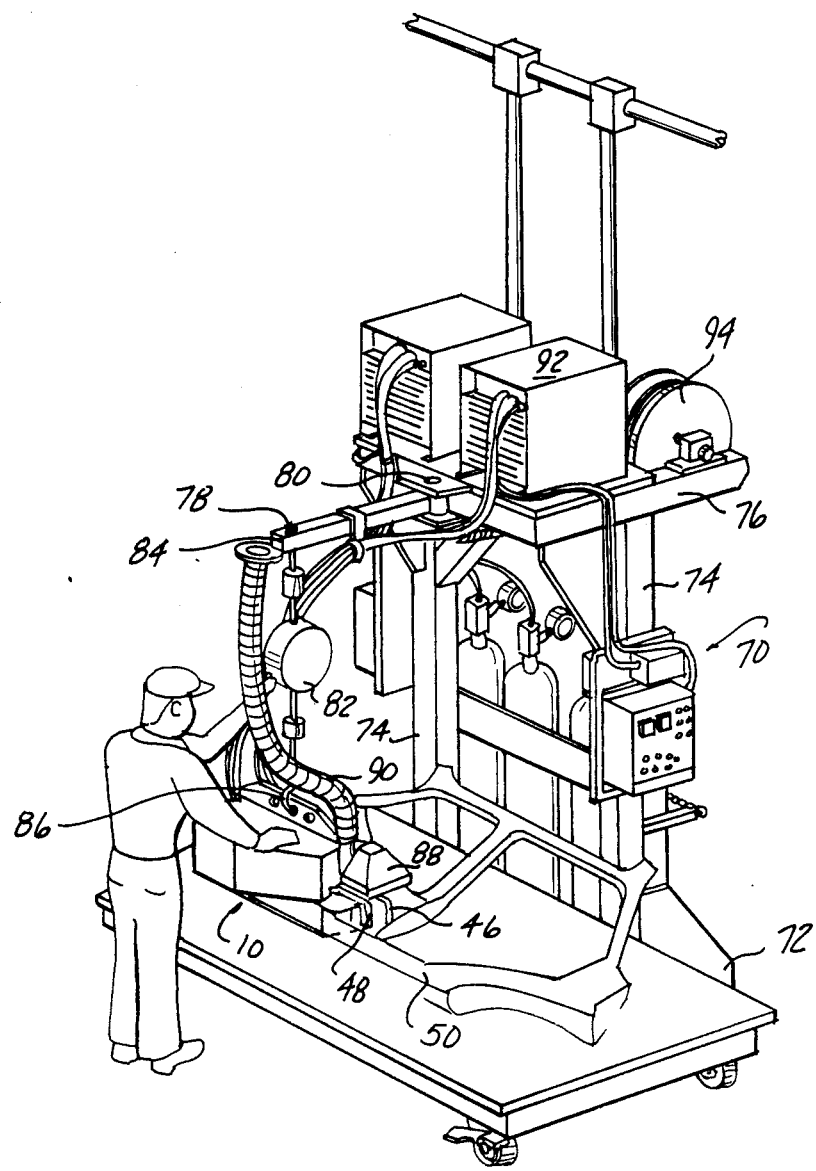
FIG. 1 is a perspective view of a typical installation employing the multi-head indexing weld unit of the present invention on a low volume assembly line.
Figure 2:
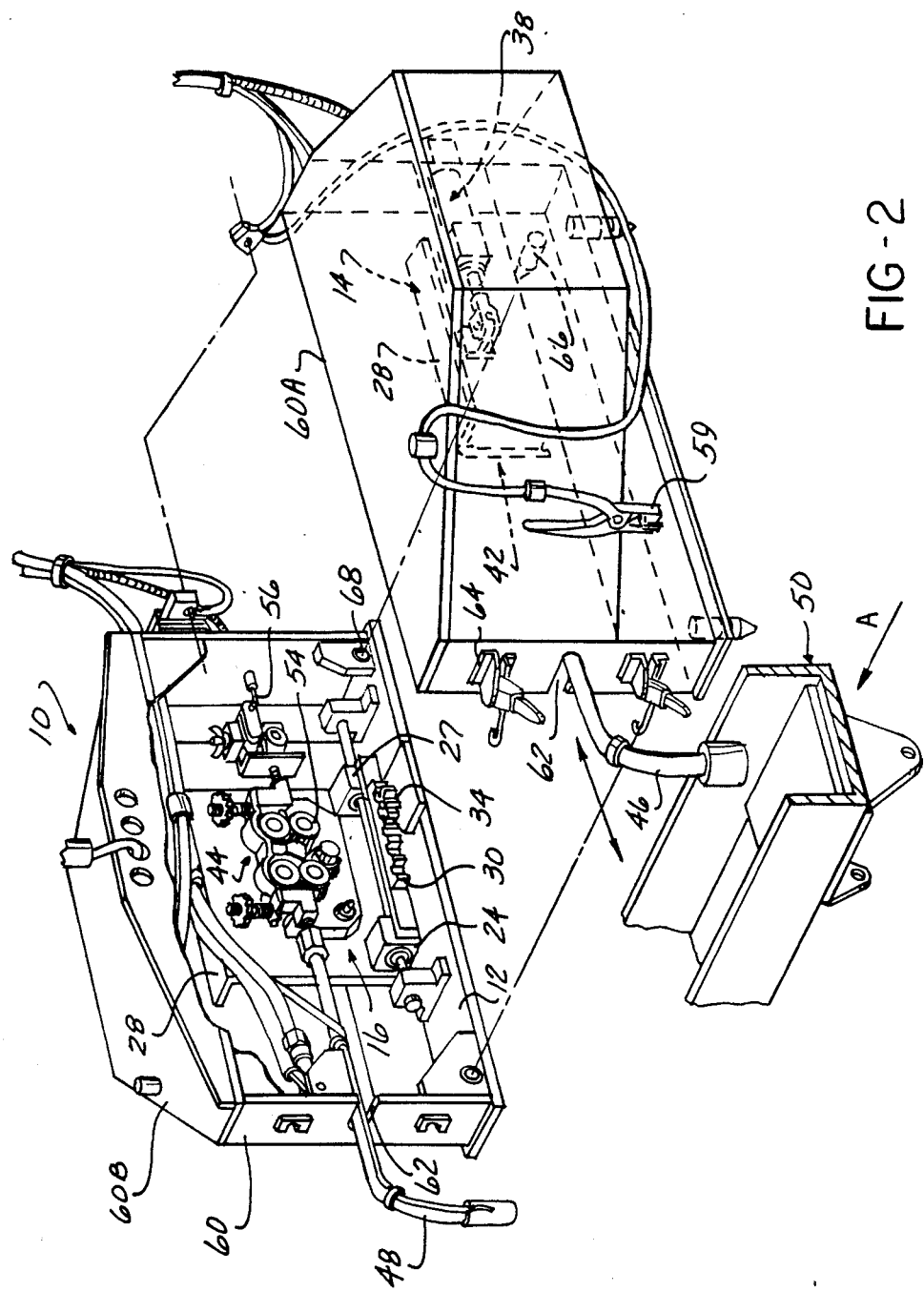
FIG. 2 is a perspective view of the multi-head indexing weld unit of the present invention in a disassembled configuration showing interior details.
Figure 3:
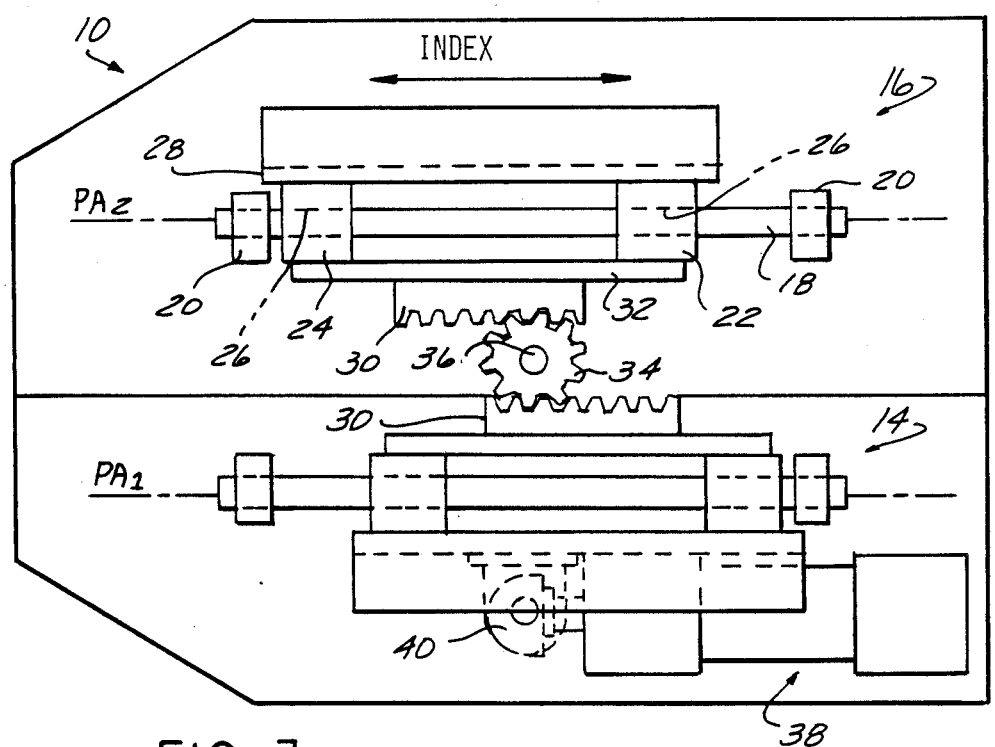
FIG. 3 is a schematic plan view of the weld unit of FIG. 2 showing the relationship of the slider assemblies.
Figure 4:
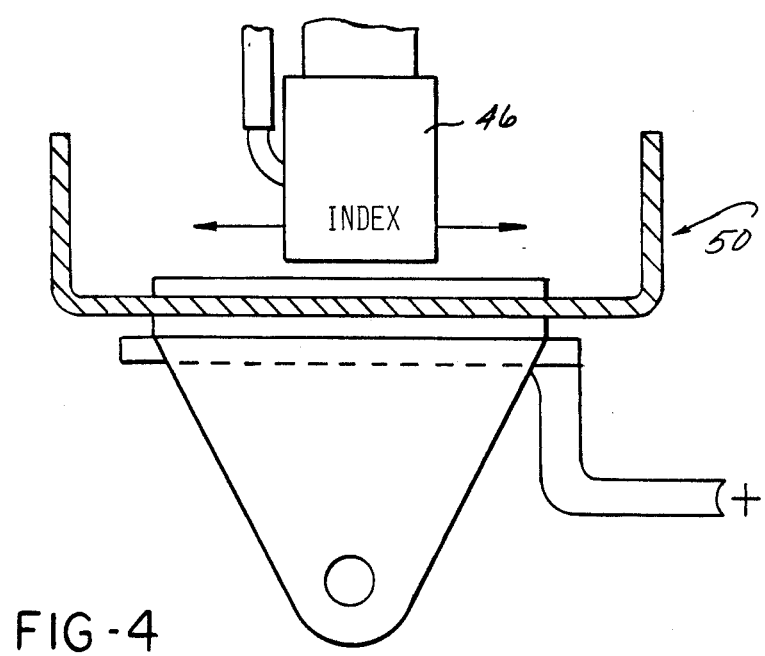
FIG. 4 is a view taken along arrow A of FIG. 2 showing the relationship of the weld heads to the workpiece.

In FIG. 2, there is shown a multi-head indexing weld unit, designated generally as 10, of the type which may be used in low to medium volume spot welding operations. The welding unit 10 comprises a plate-like base member 12 to which first and second slider assemblies 14 and 16, respectively, (see FIG. 3) are mounted in spaced parallel relationship for axial movement along parallel axes $PA^1$ and $PA^2$.

The slider assemblies 14 and 16 are mirror images of each other and, therefore, only one will be described as follows. The slider assemblies comprise a slider rod 18 fixed at each end to base member 12 by rod retaining end pieces 20. First and second slider blocks 22 and 24, having slider rod mounting bores 26 extending therethrough, are slidably mounted for movement along the slider assembly axis in axially spaced relationship to each other. Weld unit mounting plate 28, is fixedly attached to first and second slider blocks 22 and 24. Mounting plate 28 extends outwardly in a perpendicular relationship to the base member 12. Additionally, gear rack 30 is fixedly attached to first and second slider blocks 22 and 24, as by cross member 32. Gear rack 30 is oriented to face a corresponding gear rack of the corresponding slider assembly (see FIG. 3). Disposed between, and in contact with gear racks 30 is pinion gear 34, rotatably mounted on axle 36 to plate-like base member 12. Pinion gear 34 meshingly engages opposing gear racks 30 to transfer axial movement of first slider assembly 14 into opposite relative movement of second slider 16.

Motor means 38, fixed relative to base member 12, and having driving means attached to the first slider assembly 14, is operable to drive the first slider assembly 14 along its respective axis $PA^1$. The motor means may comprise a pneumatic piston/cylinder assembly with piston rod 40 fixedly attached to welding unit mounting plate 28 of first slider assembly 14. Extension of piston rod 40 will act to drive slider assembly 14 axially forwardly along axis $PA^1$. Simultaneously, rack and pinion means 30, 34 will transfer this forward motion of slider assembly 14 into rearward motion of slider assembly 16 along its respective axis $PA^2$.

First and second welding units 42 and 44, respectively, are fixedly attached to respective weld unit mounting plates 28 of first and second slider assemblies 14 and 16. Extending outwardly from first and second welding units 42 and 44 are first and second welding heads 46 and 48, respectively. Welding heads 46 and 48 extend outwardly from welding units 42 and 44 to terminate at predetermined locations (see FIGS. 2, 4, 5 and 6) with relationship to workpiece 50.

Figure 5:
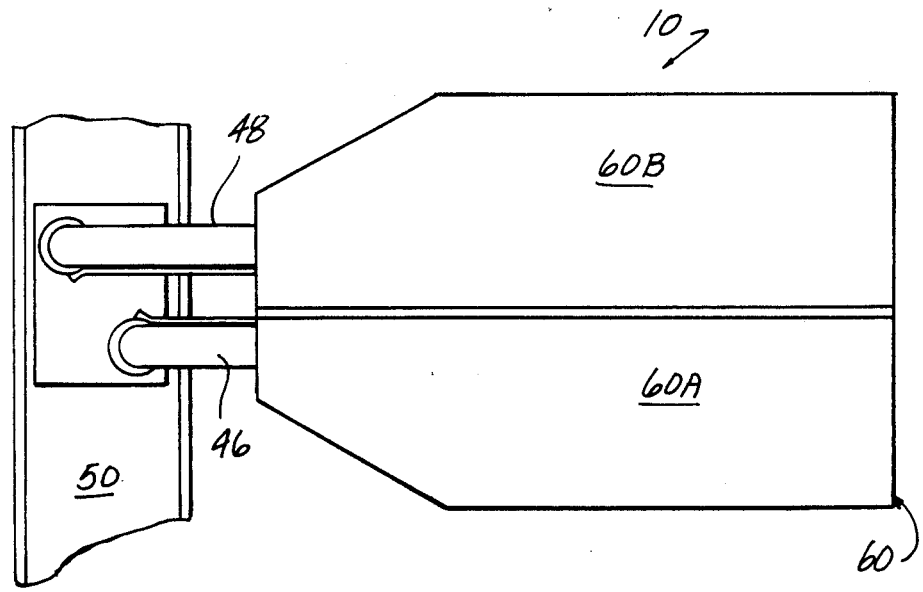
FIGS. 5 and 6 show the relationship of the weld heads before and after indexing.
Figure 6:
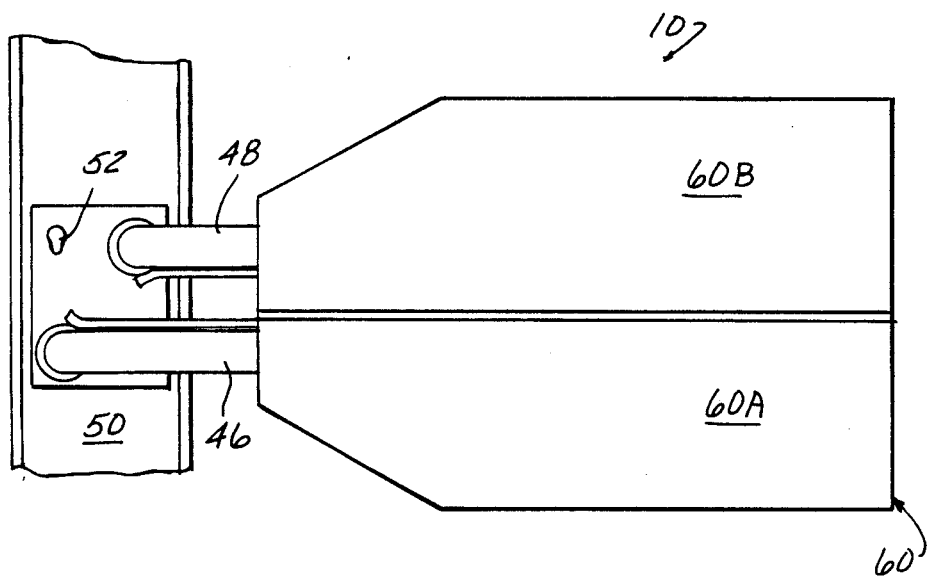

In operation, first welding unit 42 and its corresponding slider assembly 14 is positioned in a retracted position along first slider axis PA$^1$, and the second welding unit 44 and its corresponding slider assembly 16 is mounted in an advanced position along said second slider axis PA$^2$, as shown in FIG. 5. Subsequently, motor means 38 is actuated to drive piston rod 40 outwardly thereby moving first welding unit 42 and its corresponding welding head 46 from the position shown in FIG. 5 to that shown in FIG. 6. Simultaneously, rack and pinion means 30, 34 transfers the forward motion of first slider assembly 14 into rearwardly directed motion for second slider assembly 16. This rearwardly directed motion moves second welding unit 44 and its corresponding welding head 48 from the position shown in FIG. 5 to that shown in FIG. 6. The indexing described above facilitates formation of an axially placed series of closely adjacent welds 52 which, due to the closeness of spacing between the welds, would not be possible were the weld heads adjacent to one another during welding.

In the embodiment shown in FIG. 2, the welding units 42 and 44 comprise automatic-feed gas metal arc (GMA) spot welding units. The units have feeding means 54 for continuously supplying welding rod 56 to weld heads 46 and 48. Additionally, conduit means 58 supply inert gas to the weld zone during welding operations. Electrical means 59, well known in the art, are provided to establish a desired electrical potential, indicated in FIG. 4., at the weld head and in the workpiece 50 during welding operations.

To protect the weld units and slider assemblies from harsh environments, a housing, designated generally 60, may be provided to cover the slider assemblies 14 and 16 and their respective welding units 42 and 44. As shown in FIG. 2, the housing may be divided into first and second halves 60A and 60B, each having a top, sides, front, rear and bottom portions. The base member 12, upon which the slider assemblies are mounted, may be utilized as the bottom portion of the housing. In this configuration, first slider assembly 14 and its corresponding welding unit 42 are contained within first half 60A and second slider assembly 16 and its corresponding welding unit 44 are contained within second half 60B. Disposed between the two slider units, within one housing, is pinion gear 34. The front of the housing has openings 62 through which the weld heads 46 and 48 pass. Additionally, various openings (not shown) are positioned in the rear or top of the housing. Electrical wiring, inert gas hose, weld rod and power sources for the weld units and motor means are passed through these various openings.

The two housing portions 60A and 60B are held together through the use of suitable clamping means, such as latches 64. Precise alignment of the two housings relative to one another, thereby assuring proper engagement of the rack and pinion means, is maintained through the use of alignment pegs 66 extending outwardly from housing 60A. The alignment pegs 66 engage peg alignment bores 68 correspondingly positioned in second housing portion 60B. To service a welding unit or slider assembly, an operator simply releases latches 64 and pulls the two housings 60A and 60B apart.

The preferred application for the welding unit 10, described above, is to suspend the housing 60, and corresponding welding units, from a work station designated generally as 70 having means for positioning the weld unit 10 relative to workpiece 50. The framework 70 has a base 72 from which extend support members 74. An upper mounting member 76 is supported by members 74 and has a weld head supporting arm 78 having a first end 80 pivotally attached to the upper member for rotation in an arc above workpiece 50. A winch 82 is attached to and extends downwardly from a second end 84 of weld head supporting arm 78. The winch has attaching means, such as hook 86, for supporting housing 10 and is operable to raise and lower the weld unit relative to workpiece 50. Weld head supporting arm 78 and winch 82 operate to allow weld unit placement, relative to workpiece 50.

Exhaust means comprising exhaust hood 88 and exhaust conduit 90 are mounted on weld unit housing 10 and are supported by frame 70. Conduit 90 may be connected to exhaust blower means (not shown) for removal of welding fumes produced during welding operations. Additionally, upper mounting member 76 may be used as a supporting p___.
electrical apparatus 92 and continuous welding rod spools 94 used to operate weld units 42 and 44.

While certain embodiments of the invention have been described in detail above in relation to a welding unit, it will be apparent to those skilled in the art that the disclosed embodiment may be modified. Therefore, the foregoing description is to be considered exemplary rather than limiting, and the true scope of the invention is that defined in the following claims.

What is claimed is:

1. A multi-head, indexing weld unit comprising:
    a plate-like base member;
    first and second slider assemblies, mounted to said base member, in spaced parallel relationship for movement axially along parallel axes;
    rack and pinion means, disposed between, and fixedly mounted to said first and second slider assemblies to transfer linear motion of said first slider assembly along its respective axis to opposite motion of said second slider assembly, relative to said first assembly, along its respective axis;
    motor means, fixed relative to said base member, attached to said first slider assembly, to drive said first slider assembly along its respective axis;
    first and second welding units, mounted on said first and second slider assemblies respectively, having first and second welding heads extending outwardly from said units to terminate at predetermined locations, said first welding unit advanced along said first slider axis and said second welding unit retracted along said second slider axis;
    said motor means actuable to move said first welding unit along said first slider assembly to a retracted position relative to said first slider axis and to move said second welding unit along said second slider assembly to an advanced position relative to said second slider axis thereby indexing said outwardly extending weld heads relative to each other.

2. A multi-head indexing weld unit, as defined in claim 1, further comprising:
    a housing, having a top, sides, and a bottom, and having openings in the sides thereof for the passage of said outwardly extending weld heads.

3. A multi-head indexing weld unit, as defined in claim 2, further comprising:

locating means, extending outwardly from said housing for placement of said weld unit relative to a work surface.

4. A multi-head indexing weld unit, as defined in claim 2, wherein said housing further comprises:
first and second halves, retained in engagement by clamping means.

5. A multi-head indexing weld unit, as defined in claim 2, further comprising:
means for supporting said housing in a desired, operable position relative to a work station.

6. A multi-head indexing weld unit, as defined in claim 1, each of said first and second slider assemblies further comprising:
a slider rod, fixed at each end to said base member;
first and second slider blocks, having slider rod mounting bores passing therethrough, slidably mounted for movement along said slider rod in axially spaced relationship to each other;
a weld unit mounting plate fixedly attached to said first and second slider blocks, extending outwardly from said slider assembly in a perpendicular relationship to said base;
a gear rack, fixedly attached to said first and second slider blocks, oriented to face a gear rack of the corresponding slider assembly.

7. A multi-head indexing weld unit, as defined in claim 1, wherein said pinion gear, for transferring axial movement of said first slider assembly to opposite movement of said second slider assembly is mounted to said base member at a location between said first and second slider assemblies.

8. A multi-head indexing weld unit, as defined in claim 1, said motor means comprising:
a pneumatic motor having cylinder means fixedly mounted relative to said base member and a piston rod attached to said first slider assembly.

9. A multi-head indexing weld unit, as defined in claim 1, each of said first and second welding units further comprising:
an automatic feed, gas metal arc (GMA) spot welding unit having means for continuously feeding welding rod to said welding head;
conduit means for delivery of inert gas to said welding head; and
electrical means for establishing a desired electrical potential at said weld head and in said workpiece during welding operations.

10. A multi-head indexing weld unit, as defined in claim 1, further comprising:
a frame having a base, upwardly extending support members extending therefrom, an upper mounting member, supported by said support members, and a weld head supporting arm, having a first end pivotally attached to said upper mounting member for rotation in an arc above a work station;
a winch, attached to, and extending downwardly from a second end of said supporting arm, having attaching means at the free end thereof, for supporting said weld unit, and operable to raise and lower said weld unit relative to a workpiece;
said weld unit movable, by said winch and said pivotable weld head supporting arm, to predetermined locations on a workpiece.

11. A multi-head indexing weld unit, as defined in claim 10, further comprising:
exhaust means, mounted on said weld unit and supported by said frame means for removal of welding fumes.

12. A multi-head indexing weld unit, as defined in claim 10, further comprising:
a support platform disposed on said upper mounting member for placement of electrical apparatus for said weld units.

* * * * *